(12) United States Patent
Qu et al.

(10) Patent No.: US 11,468,655 B2
(45) Date of Patent: Oct. 11, 2022

(54) METHOD AND APPARATUS FOR EXTRACTING INFORMATION, DEVICE AND STORAGE MEDIUM

(71) Applicant: BEIJING BAIDU NETCOM SCIENCE AND TECHNOLOGY CO., LTD., Beijing (CN)

(72) Inventors: Fu Qu, Beijing (CN); Minhui Pang, Beijing (CN); Guangyao Han, Beijing (CN); Zeqing Jiang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 41 days.

(21) Appl. No.: 17/085,178

(22) Filed: Oct. 30, 2020

(65) Prior Publication Data

US 2021/0326628 A1 Oct. 21, 2021

(30) Foreign Application Priority Data

Apr. 17, 2020 (CN) .......................... 202010306625.6

(51) Int. Cl.
*G06V 10/00* (2022.01)
*G06V 10/24* (2022.01)
(Continued)

(52) U.S. Cl.
CPC ......... *G06V 10/243* (2022.01); *G06K 9/6259* (2013.01); *G06V 30/414* (2022.01); *G06V 30/416* (2022.01)

(58) Field of Classification Search
CPC ............... G06K 9/3275; G06K 9/6259; G06K 9/00463; G06K 9/00469; G06K 9/48;
(Continued)

(56) References Cited

U.S. PATENT DOCUMENTS 6,678,416 B1 * 1/2004 Sun .......................... G06T 7/251
382/235
6,716,175 B2 * 4/2004 Geiser ....................... G06T 7/12
600/450
(Continued)

FOREIGN PATENT DOCUMENTS

CN  110766014       2/2020
EP  3796218 A1     3/2021
(Continued)

OTHER PUBLICATIONS

Extended European Search Report issued in application No. EP21163153.6 dated Aug. 27, 2021.
(Continued)

*Primary Examiner* — Amir Alavi
(74) *Attorney, Agent, or Firm* — Knobbe, Martens, Olson & Bear LLP

(57) ABSTRACT

Embodiments of the present disclosure disclose a method and apparatus for extracting information, a device and a storage medium, relate to the field of image processing technology. The method may include: acquiring a location template corresponding to a category of a target document image; determining key point locations on the target document image; generating a transformation matrix based on the key point locations on the target document image and key point locations on the location template; determining locations of information corresponding to the target document image, based on locations of information on the location template and the transformation matrix; and extracting information at the locations of information corresponding to the target document image to obtain information in the target document image.

15 Claims, 5 Drawing Sheets

(51) Int. Cl.
*G06K 9/62* (2022.01)
*G06V 30/414* (2022.01)
*G06V 30/416* (2022.01)

(58) Field of Classification Search
CPC .. G06K 9/4609; G06K 9/6203; G06K 9/6204; G06K 9/32; G06K 9/6202; G06T 7/0083; G06T 7/0081; G06T 7/001; G06T 7/0024; G06T 3/00; G06T 5/001; G06T 5/006; G06T 11/60; G06T 2207/10016; G06V 10/243; G06V 30/414; G06V 30/416
See application file for complete search history.

(56) References Cited

U.S. PATENT DOCUMENTS

| | | | | |
|---|---|---|---|---|
| 7,091,988 | B2* | 8/2006 | Hori | G06T 7/251 |
| | | | | 345/474 |
| 8,805,007 | B2* | 8/2014 | Zhang | G06T 7/74 |
| | | | | 382/103 |
| 9,436,875 | B2* | 9/2016 | Curcio | G06V 20/46 |
| 10,311,556 | B1 | 6/2019 | Farivar | |
| 10,588,577 | B2* | 3/2020 | Zhang | A61B 5/026 |
| 10,964,015 | B2* | 3/2021 | Hu | G01N 21/8851 |
| 2007/0009159 | A1* | 1/2007 | Fan | G06V 10/52 |
| | | | | 382/209 |
| 2014/0161354 | A1* | 6/2014 | Curcio | G06K 9/629 |
| | | | | 382/190 |
| 2020/0097711 | A1 | 3/2020 | Venkateswaran | |
| 2020/0327356 | A1* | 10/2020 | Raj | G06V 10/25 |
| 2021/0042588 | A1* | 2/2021 | Shaw | G06T 7/60 |
| 2021/0326628 | A1* | 10/2021 | Qu | G06V 10/757 |

FOREIGN PATENT DOCUMENTS

| | | |
|---|---|---|
| JP | H10208040 A | 8/1998 |
| JP | 2008228211 A | 9/2008 |
| JP | 2017059235 A | 3/2017 |
| JP | 6574921 61 | 9/2019 |
| JP | 6574928 B1 | 9/2019 |
| JP | 2019165836 A | 10/2019 |
| JP | 2020006152 A | 1/2020 |
| WO | WO 2020/008629 A1 | 1/2020 |

OTHER PUBLICATIONS

Liu, et al., Scene text detection and recognition with advances in deep learning: a survey, International Journal on Document Analysis and Recognition 22(2):143-162 (2019).
Viet, et al., A robust end-to-end information extraction system for Vietnamese identify cards, 2019 6$^{th}$ NAFOSTED Conference on Information and Computer Science (NICS), IEEE p. 483-488 (2019).
Japanese Office Action issued in application No. JP 2021-052750 dated Apr. 26, 2022.
Office Action dated May 5, 2022 in Application No. EP 21163153.6.

* cited by examiner

China XX Bank

Deposit interest list

April 14, 2020

A○　　　　　　　　　　　　　　　　○B

| | |
|---|---|
| Name | XXX |
| Account/card number ○E | 121689015XXXX |
| Actual paid principal and interest | RMB20,988.65 ○F |
| Principal | RMB20,000.00 |
| Interest | 1235.82 |
| Tax rate | 20.00% |
| Taxable interest | 247.17 |
| Withholding tax | 247.17 |
| After-tax interest | 988.65 |

C○　　　　　　　　　　　　　　　　○D

Manager: XXX

Fig. 4B

METHOD AND APPARATUS FOR EXTRACTING INFORMATION, DEVICE AND STORAGE MEDIUM

CROSS-REFERENCE TO RELATED APPLICATIONS

This application claims priority to Chinese Application No. 202010306625.6, filed on Apr. 17, 2020 and entitled "Method and Apparatus for Extracting Information, Device and Storage Medium," the entire disclosure of which is hereby incorporated by reference.

TECHNICAL FIELD

Embodiments of the present disclosure relate to the field of computer technology, and specifically to the field of image processing technology.

BACKGROUND

With the constant development of AI (artificial intelligence) technology, the use of AI for intelligent analysis of document images is increasing. AI may perform orientation and skew correction, layout analysis, content recognition, etc. on document images. These capabilities may greatly facilitate all kinds of staff involved in the entry and review of document images, and greatly enhance the intelligentization of various business processes.

Extracting information from document images, especially application scenarios of extracting information from various tables are very extensive. At present, the main method for extracting information from a document image is to first perform optical character recognition (OCR) on an entire document image, and then structuralize an obtained result to extract corresponding information. For a document image containing a table, first a table range is reconstructed to acquire the location of each cell, then optical character recognition is performed on each cell, and finally structuralization is performed based on a table header and other conditions to extract the corresponding information.

SUMMARY

Embodiments of the present disclosure propose a method and apparatus for extracting information, a device and a storage medium.

In a first aspect, an embodiment of the present disclosure provides a method for extracting information, the method including: acquiring a location template corresponding to a category of a target document image; determining key point locations on the target document image; generating a transformation matrix based on the key point locations on the target document image and key point locations on the location template; determining locations of information corresponding to the target document image, based on locations of information on the location template and the transformation matrix; and extracting information at the locations of information corresponding to the target document image to obtain information in the target document image.

In a second aspect, an embodiment of the present disclosure provides an apparatus for extracting information, the apparatus including: a location template acquisition module, configured to acquire a location template corresponding to a category of a target document image; a key point location determination module, configured to determine key point locations on the target document image; a transformation matrix generation module, configured to generate a transformation matrix based on the key point locations on the target document image and key point locations on the location template; an information location determination module, configured to determine locations of information corresponding to the target document image, based on locations of information on the location template and the transformation matrix; and an information extraction module, configured to extract information at the locations of information corresponding to the target document image to obtain information in the target document image.

In a third aspect, an embodiment of the present disclosure provides an electronic device, the device electronic including: at least one processor; and a memory, communicatively connected with the at least one processor, the memory storing an instruction executable by the at least one processor, the instruction, when executed by the at least one processor, causing the at least one processor to perform the method according to any implementation of the first aspect.

In a fourth aspect, an embodiment of the present disclosure provides a non-transitory computer readable storage medium, storing a computer instruction, the computer instruction being used to cause a computer to perform the method according to any implementation of the first aspect.

The method and apparatus for extracting information, device and storage medium provided by embodiments of the present disclosure, first acquire a location template corresponding to a category of a target document image; determine key point locations on the target document image; then generate a transformation matrix based on the key point locations on the target document image and key point locations on the location template; determine locations of information corresponding to the target document image, based on locations of information on the location template and the transformation matrix; and finally extract information at the locations of information corresponding to the target document image to obtain information in the target document image. By constructing a location template of a document image of a specific category, locations of information corresponding to the document image of the category are determined, and information is extracted from the locations of information corresponding to the document image, thereby achieving simple and rapid information extraction.

It should be appreciated that the description of the Summary is not intended to limit the key or important features of embodiments of the present disclosure, or to limit the scope of the present disclosure. Other features of the present disclosure will become readily comprehensible through the following description.

BRIEF DESCRIPTION OF THE DRAWINGS

By reading the detailed description of non-limiting embodiments with reference to the following accompanying drawings, other features, objectives and advantages of the present disclosure will become more apparent. The accompanying drawings are used to better understand the present solution and do not constitute a limitation to the present disclosure.

FIG. 4B shows a schematic diagram of a transformed document image;

DETAILED DESCRIPTION OF EMBODIMENTS

Example embodiments of the present disclosure are described below in combination with the accompanying drawings, and various details of embodiments of the present disclosure are included in the description to facilitate understanding, and should be considered as illustrative only. Accordingly, it should be recognized by one of the ordinary skilled in the art that various changes and modifications may be made to embodiments described herein without departing from the scope and spirit of the present disclosure. Also, for clarity and conciseness, descriptions for well-known functions and structures are omitted in the following description.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
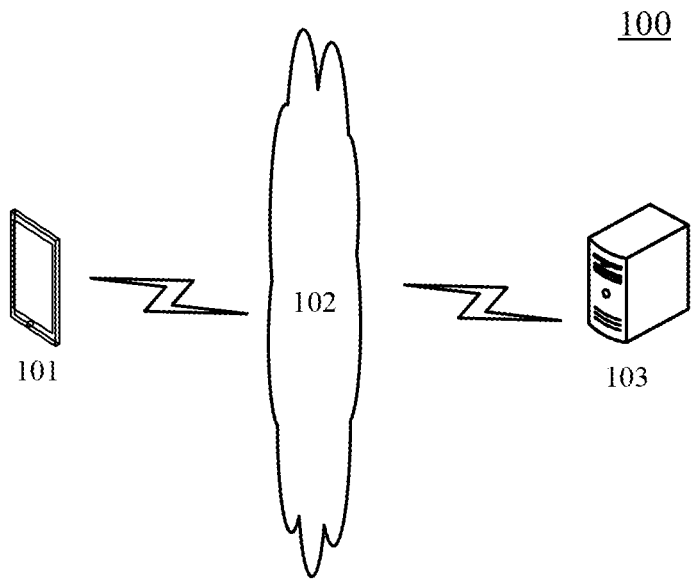
FIG. 1 is a diagram of an example system architecture in which embodiments of the present disclosure may be implemented.

FIG. 1 illustrates an example system architecture 100 in which a method for extracting information or an apparatus for extracting information according to embodiments of the present disclosure may be implemented.

As shown in FIG. 1, the system architecture 100 may include a terminal device 101, a network 102 and a server 103. The network 102 serves as a medium providing a communication link between the terminal device 101 and the server 103. The network 102 may include various types of connections, such as wired or wireless communication links, or optic fibers.

A user may use the terminal device 101 to interact with the server 103 through the network 102 to receive or send messages or the like. Various client applications, such as document intelligent processing applications, or image processing applications, may be installed on the terminal device 101.

The terminal device 101 may be hardware or software. When the terminal device 101 is hardware, the terminal device 101 may be various electronic devices, including but not limited to smart phones, tablet computers, laptop portable computers, desktop computers or the like. When the terminal device 101 is software, the terminal device 101 may be installed in the above electronic devices. The terminal device 101 may be implemented as a plurality of pieces of software or software modules, or as a single piece of software or software module, which is not specifically limited herein.

The server 103 may provide various services. For example, the server 103 may analyze and process a target document image and other data acquired from the terminal device 101, and generate a processing result (for example, information in the target document image).

It should be noted that the server 103 may be hardware or software. When the server 103 is hardware, the server 103 may be implemented as a distributed server cluster composed of a plurality of servers, or as a single server. When the server 103 is software, the server 103 may be implemented as a plurality of pieces of software or software modules (for example, for providing distributed services), or as a single piece of software or software module, which is not specifically limited herein.

It should be noted that the method for extracting information provided in embodiments of the present disclosure is generally performed by the server 103, and accordingly, the apparatus for extracting information is generally provided in the server 103.

It should be understood that the numbers of terminal devices, networks, and servers in FIG. 1 are merely illustrative. Depending on the implementation needs, there may be any number of terminal devices, networks, and servers. When the target document image is stored in the server 103, the system architecture 100 may not include the terminal device 101 and the network 102.

Figure 2:
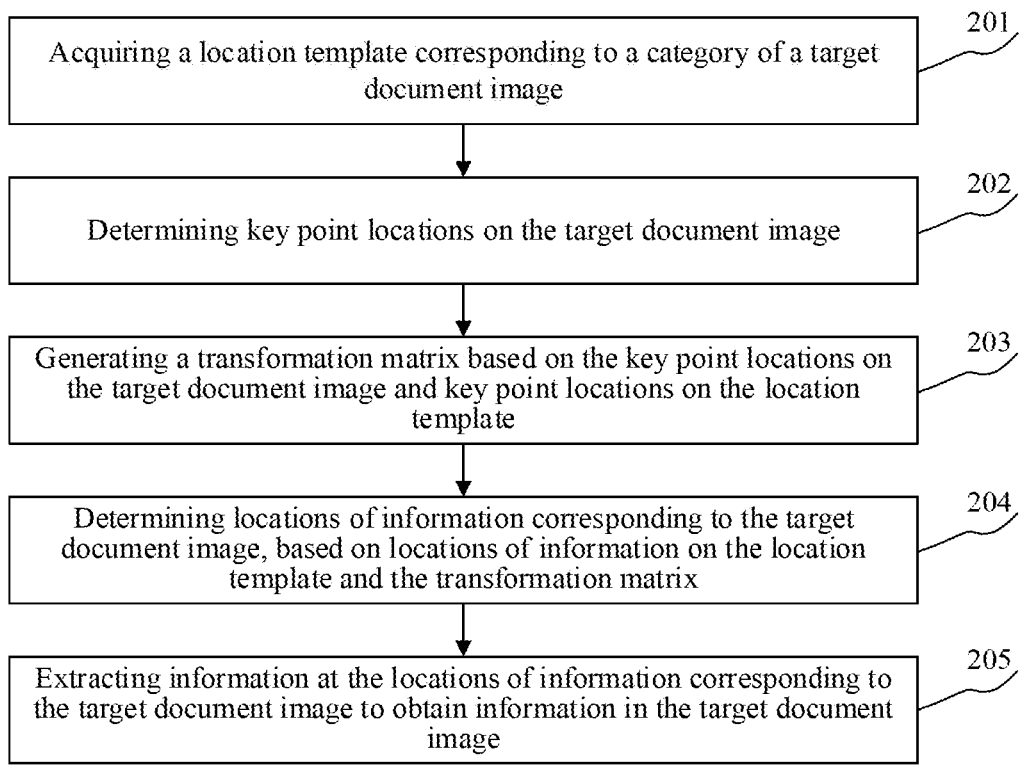
FIG. 2 is a flowchart of a method for extracting information according to an embodiment of the present disclosure.

With further reference to FIG. 2, a flow 200 of a method for extracting information according to an embodiment of the present disclosure is illustrated. The method for extracting information includes the following steps.

Step 201, acquiring a location template corresponding to a category of a target document image.

In the present embodiment, an executing body of the method for extracting information (for example, the server 103 shown in FIG. 1) may first determine the category of the target document image; and then acquire the corresponding location template based on the category of the target document image. Here, the target document image is a document image that requires information extraction. In some embodiments, if the executing body stores the target document image locally, the executing body may directly acquire the target document image locally. In some embodiments, if a terminal device (for example, the terminal device 101 shown in FIG. 1) stores the target document image, a user may use the terminal device to send the target document image to the executing body.

Typically, document images of the same category correspond to the same location template. The document images of the same category may have the same layout, and different document images of the same category may have different information content. In addition, different document images of the same category may also have different orientations, tilts, and so on. For example, images of the same version of the deposit interest list of the same bank belong to the same category. Images of deposit interest lists of different banks or different versions of deposit interest lists of the same bank belong to different categories. There may be many categories of information on the document image, for example, a version of the deposit interest list of a bank may contain various categories of information such as name, account/card number, actual paid principal and interest, principal, interest, tax rate, taxable interest, withholding tax, or after-tax interest.

Here, the location template corresponding to document images of a category may be provided with key point locations on a standard document image of the category and locations of various categories of information thereon. The document images of the same category correspond to a standard document image. The standard document image is a document image having a fixed size, a fixed orientation, and a fixed tilt (usually no tilt).

The key points on the document image may be points on a frame containing all the information on the document image. Typically, the key points on the document image must include four vertices on the frame. In addition, the key points on the document image may alternatively include other points on the frame. Therefore, the document image includes at least four key points. For example, for a document image having a frame, the key points may include the four vertices on the frame. For a document image of a needle punching category, the key points may include four marking points when the needle punching is printed.

Locations of information on the document image may be diagonal points on a frame containing the information, for example, the upper left vertex and the lower right vertex on the frame containing the information.

Taking a document image containing a table as an example, the four vertices of the table may be the key point locations on the document image, and the upper left and lower right vertices of the cell may be the locations of information on the document image.

Here, location templates corresponding to various categories of document images may be generated in advance. Taking the location template corresponding to the target document image as an example, the generation steps are as follows.

First, acquiring a standard document image of the same category as the target document image, and key point locations and locations of information on the standard document image.

Then, labeling the standard document image based on the key point locations and the locations of information on the standard document image to generate the location template.

Step 202, determining key point locations on the target document image.

In the present embodiment, the executing body may determine the key point locations on the target document image. Here, the key point locations may be the coordinates of the key points.

Generally, the executing body may determine the key point locations on the target document image based on traditional or deep learning key point detection technology. Here, the traditional key point detection technology may be used to perform key point detection on document images having a frame. Specifically, the executing body may first detect contour points of the frame in the document image, and then determine the key points from the contour points based on a certain strategy. For example, to add a circumscribed circle to the contour points, contour points on the circumscribed circle are the key points. The deep learning key point detection technology may be applied to any category of document image for key point detection. For example, a multi-layer convolutional neural network is used to detect the key points on the document image. The multi-layer convolutional neural network may or may not include a fully connected layer. In the case of the multi-layer convolutional neural network including a fully connected layer, the output of the multi-layer convolutional neural network may be the coordinates of the key points. In the case of the multi-layer convolutional neural network not including the fully connected layer, the output of the multi-layer convolutional neural network may be a heat map. The heat value of each point on the heat map may represent a probability that each point is the key point. The larger the heat value, the greater the probability that the corresponding point is the key point.

Step 203, generating a transformation matrix based on the key point locations on the target document image and key point locations on the location template.

In the present embodiment, the executing body may generate the transformation matrix based on the key point locations on the target document image and the key point locations on the location template.

Typically, the transformation matrix may be a matrix that can realize a mapping between the target document image and the location template, and stores mapping relationship between the points on the target document image and the points on the location template. The transformation matrix may be a first transformation matrix or a second transformation matrix. The first transformation matrix may be a matrix that maps from the target document image to the location template, and stores the mapping relationship between the points on the target document image and the points on the location template. Based on the key point locations on the target document image and the key point locations on the location template, the mapping relationship from the target document image to the location template can be determined, thereby generating the first transformation matrix. The second transformation matrix may be a matrix that maps from the location template to the target document image, and stores the mapping relationship between the points on the location template and the points on the target document image. Based on the key point locations on the location template and the key point locations on the target document image, the mapping relationship from the location template to the target document image can be determined, thereby generating the second transformation matrix.

Step 204, determining locations of information corresponding to the target document image, based on locations of information on the location template and the transformation matrix.

In the present embodiment, the executing body may determine the locations of information corresponding to the target document image, based on the locations of information on the location template and the transformation matrix.

In some embodiments, if the transformation matrix is the first transformation matrix, the executing body may first transform the target document image based on the first transformation matrix to obtain a transformed document image; then use the locations of information on the location template as locations of information on the transformed document image. Since the first transformation matrix is the matrix that maps from the target document image to the location template, transforming the target document image based on the first transformation matrix can standardize the target document image into the transformed document image. Since the size, orientation, tilt, etc. of the transformed document image are standardized to be consistent with the location template, the locations of information on the transformed document image is consistent with the locations of information on the location template.

In some embodiments, if the transformation matrix is the second transformation matrix, the executing body may transform the locations of information on the location template based on the second transformation matrix to obtain the locations of information on the target document image. Since the second transformation matrix is the matrix that maps from the location template to the target document image, transforming the locations of information on the location template based on the second transformation matrix can transform the locations of information on the location template into the locations of information on the target document image.

Step 205, extracting information at the locations of information corresponding to the target document image to obtain information in the target document image.

In the present embodiment, the executing body may extract the information at the locations of information corresponding to the target document image to obtain the information in the target document image. For example, if optical character recognition is performed on the locations of information corresponding to the target document image, the recognition result is the information in the target document image.

The method for extracting information provided by embodiments of the present disclosure, first acquires a location template corresponding to a category of a target document image; determines key point locations on the target document image; then generates a transformation matrix based on the key point locations on the target document image and key point locations on the location template; determines locations of information corresponding to the target document image, based on locations of information on the location template and the transformation matrix; and finally extracts information at the locations of information corresponding to the target document image to obtain information in the target document image. By constructing a location template of a document image of a specific category, locations of information corresponding to the document image of the category is determined, and information is extracted from the locations of information corresponding to the document image, thereby achieving simple and rapid information extraction. The method solves the technical problem of poor structured effect in the existing technology, and can be applied to the poor structured effect in the existing technology, especially in scenarios such as obviously having large handwritten letters and offsetting of needle punching content.

Further, the method for extracting information provided in embodiments of the present disclosure may be integrated into various document intelligent processing platforms, as an extension of platform functions, helping the platform to acquire better results in tasks such as extracting information on related document images.

Figure 3:
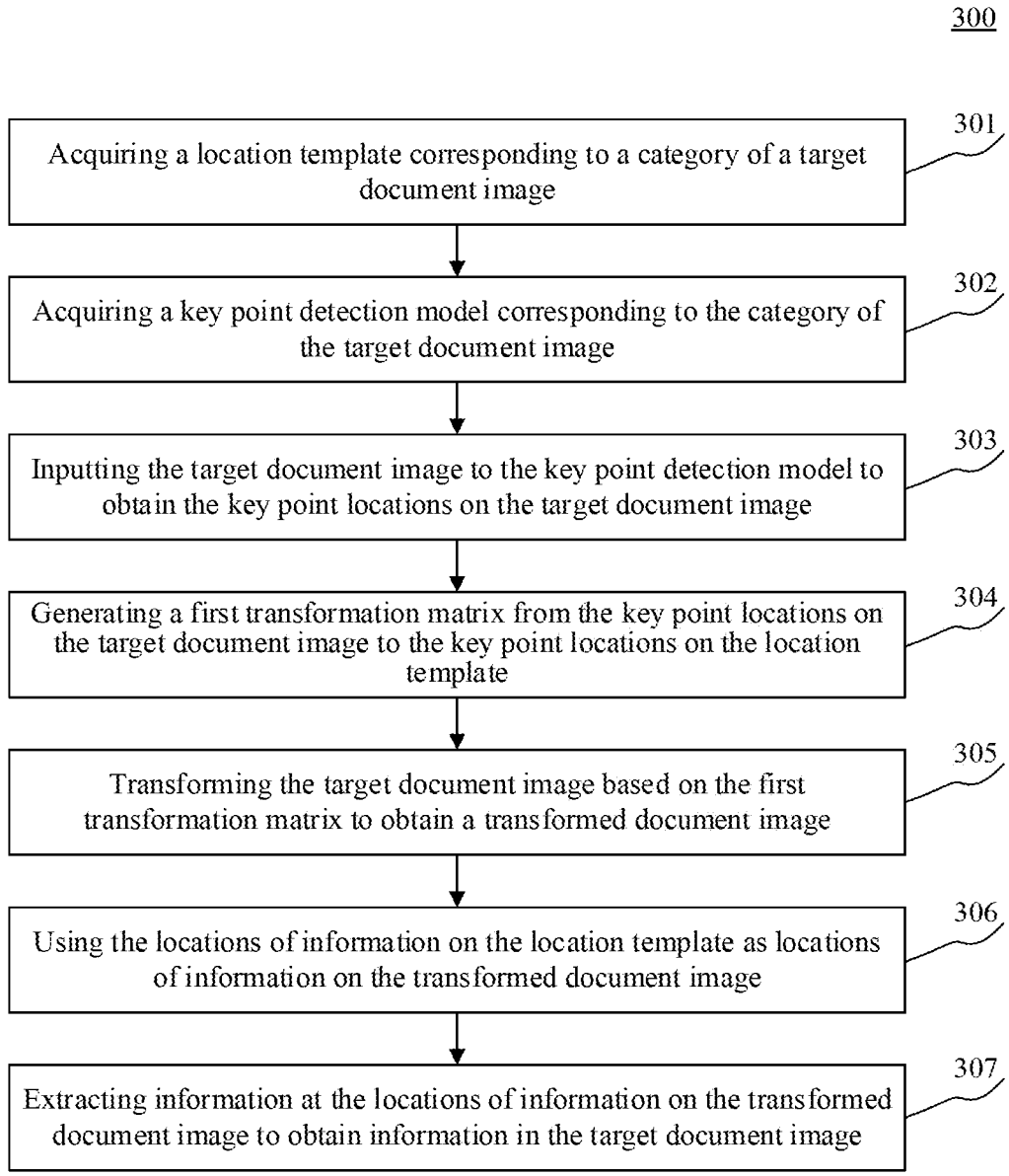
FIG. 3 is a flowchart of the method for extracting information according to another embodiment of the present disclosure.

With further reference to FIG. 3, a flow 300 of the method for extracting information according to another embodiment of the present disclosure is illustrated. The method for extracting information includes the following steps.

Step 301, acquiring a location template corresponding to a category of a target document image.

In the present embodiment, the specific operation of step 301 has been described in detail in step 201 in embodiments shown in FIG. 2 and detailed description thereof will be omitted.

Step 302, acquiring a key point detection model corresponding to the category of the target document image.

In the present embodiment, an executing body of the method for extracting information (for example, the server 103 shown in FIG. 1) may acquire the key point detection model corresponding to the category of the target document image.

Typically, document images of the same category correspond to the same key point detection model. The key point detection model may be used to detect the key point locations on the document image of the corresponding category. The key point detection model is a key point detection technology based on deep learning, which may be obtained through deep learning training.

Taking the key point detection model corresponding to the category of the target document image as an example, the training steps are as follows.

First, acquiring a document image set of the same category as the target document image, and key point locations on document images in the document image set.

Here, the document image set may include a large number of document images of the same category as the target document image.

Then, labeling the corresponding document images based on the key point locations on the document images in the document image set to generate a sample document image set.

Finally, training to obtain the key point detection model using the sample document image set.

Typically, a sample document image in the sample document image set is used as input, and key point locations labeled by the input sample document image are used as output, and a multi-layer convolutional neural network is trained to obtain the key point detection model.

Step 303, inputting the target document image to the key point detection model to obtain the key point locations on the target document image.

In the present embodiment, the executing body may input the target document image to the key point detection model to obtain the key point locations on the target document image.

Typically, the key point detection model may be applied to any category of document image for key point detection. The key point detection model may or may not include a fully connected layer. In the case of the key point detection model including a fully connected layer, the output of the key point detection model may be the coordinates of the key points. In the case of the key point detection model not including the fully connected layer, the output of the key point detection model may be a heat map. The heat value of each point on the heat map may represent a probability that each point is the key point. The larger the heat value, the greater the probability that the corresponding point is the key point.

Step 304, generating a first transformation matrix from the key point locations on the target document image to key point locations on the location template.

In the present embodiment, the executing body may generate the first transformation matrix from the key point locations on the target document image to the key point locations on the location template.

Typically, the first transformation matrix may be a matrix that maps from the target document image to the location template, and stores the mapping relationship between the points on the target document image and the points on the location template. Based on the key point locations on the target document image and the key point locations on the location template, the mapping relationship from the target document image to the location template can be determined, thereby generating the first transformation matrix.

Step 305, transforming the target document image based on the first transformation matrix to obtain a transformed document image.

In the present embodiment, the executing body may transform the target document image based on the first transformation matrix to obtain the transformed document image. Since the first transformation matrix is the matrix that maps from the target document image to the location template, transforming the target document image based on the first transformation matrix can standardize the target document image into the transformed document image. Here, the size, orientation, tilt, etc. of the transformed document image are standardized to be consistent with the standard document image.

Step 306, using the locations of information on the location template as locations of information on the transformed document image.

In the present embodiment, the executing body may use the locations of information on the location template as the locations of information on the transformed document image. Since the size, orientation, tilt, etc. of the transformed document image are standardized to be consistent with the location template, the locations of information on the transformed document image is consistent with the locations of information on the location template.

Step 307, extracting information at the locations of information on the transformed document image to obtain information in the target document image.

In the present embodiment, the executing body may extract the information at the locations of information on the transformed document image to obtain the information in the target document image. For example, if optical character recognition is performed on the locations of information on the transformed document image, the recognition result is the information in the target document image.

It can be seen from FIG. 3 that, compared with embodiments corresponding to FIG. 2, the flow 300 of the method for extracting information in the present embodiment highlights the key point location determination step and the location information transformation step. Therefore, in the solution described in the present embodiment, the key point detection model is used to detect the key point locations on the document image of the corresponding category, which may be applied to any category of document image for key point detection, thereby improving the robustness of information extraction. By constructing the key point detection model and the location template for a document image of a specific category, the document image is standardized through location alignment, which realizes simple and rapid information extraction, and is robust, efficient, and accurate.

Figure 4A:
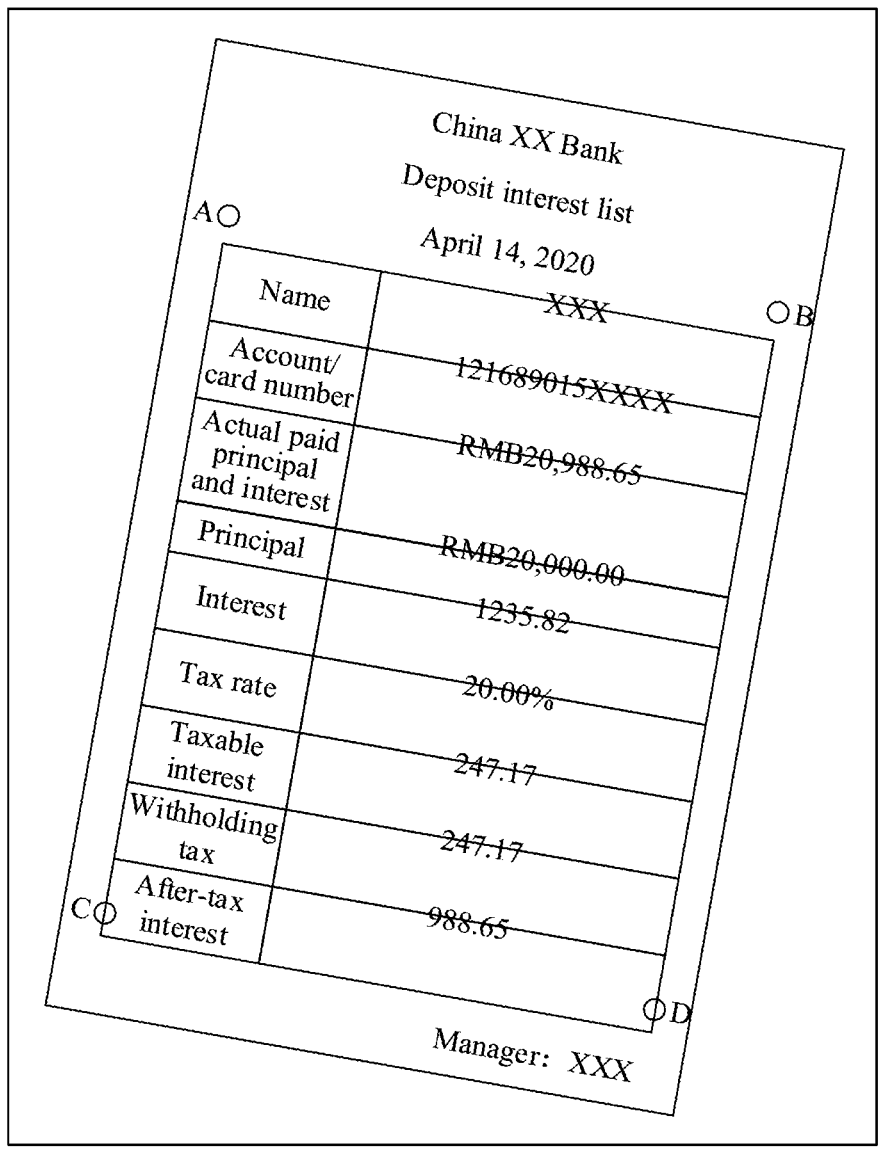
FIG. 4A shows a schematic diagram of a document image.

For ease of understanding, the following provides a scenario that may implement the method for extracting information in embodiments of the present disclosure. As shown in FIG. 4A, it shows a document image of a version of the deposit interest list of China XX Bank. The document image includes several categories of information such as name, account/card number, actual paid principal and interest, principal, interest, tax rate, taxable interest, withholding tax, or after-tax interest. When the needle punching is printed, the information content shifts upward overall. In addition, the deposit interest list on the document image tilts to the right overall. If it is necessary to extract the actual paid principal and interest on the document image in FIG. 4A, first a location template and a key point detection model corresponding to the image in FIG. 4A are acquired. After that, the image in FIG. 4A is inputted to the key point detection model, and the coordinates of the four marking points A, B, C, and D in the needle punching printed document image in FIG. 4A are outputted. Then, based on the coordinates of the marking points on the document image in FIG. 4A and the coordinates of the marking points on the location template, a first transformation matrix that can map from the document image in FIG. 4A to the location template is generated. Subsequently, the document image in FIG. 4A is transformed based on the first transformation matrix to obtain a transformed document image, as shown in detail in FIG. 4B. Finally, the upper left point E and the lower right point F of the actual paid principal and interest on the location template are labeled on the transformed document image in FIG. 4B, and the cell defined by the upper left point E and the lower right point F is extracted to obtain the actual paid principal and interest of RMB20,988.65.

Figure 5:
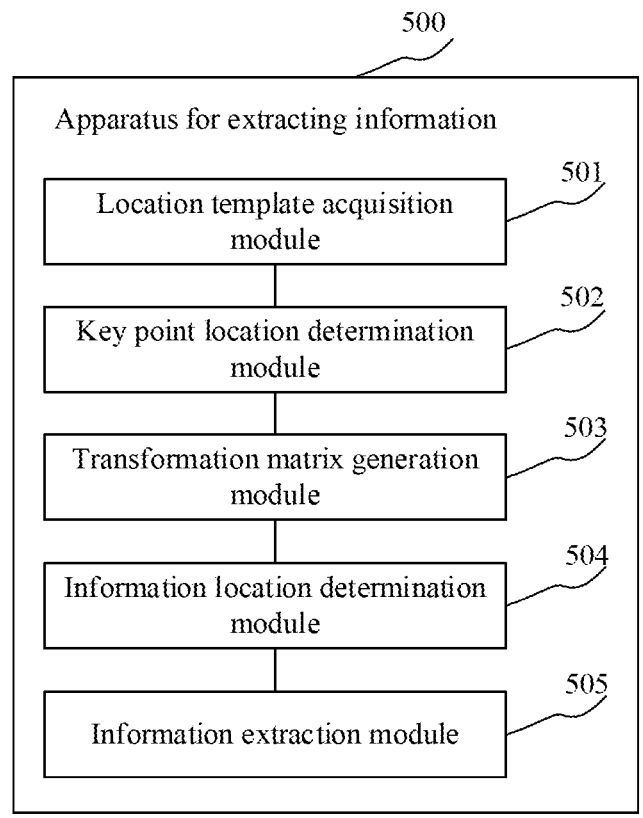
FIG. 5 is a schematic structural diagram of an apparatus for extracting information according to an embodiment of the present disclosure.

With further reference to FIG. 5, as an implementation of the method shown in the above figures, an embodiment of the present disclosure provides an apparatus for extracting information, and the apparatus embodiment corresponds to the method embodiment as shown in FIG. 2, and the apparatus may be specifically applied to various electronic devices.

As shown in FIG. 5, an apparatus 500 for extracting information of the present embodiment may include: a location template acquisition module 501, a key point location determination module 502, a transformation matrix generation module 503, an information location determination module 504 and an information extraction module 505. The location template acquisition module 501 is configured to acquire a location template corresponding to a category of a target document image. The key point location determination module 502 is configured to determine key point locations on the target document image. The transformation matrix generation module 503 is configured to generate a transformation matrix based on the key point locations on the target document image and key point locations on the location template. The information location determination module 504 is configured to determine locations of information corresponding to the target document image, based on locations of information on the location template and the transformation matrix. The information extraction module 505 is configured to extract information at the locations of information corresponding to the target document image to obtain information in the target document image.

In the present embodiment, in the apparatus 500 for extracting information: for the specific processing and the technical effects thereof of the location template acquisition module 501, the key point location determination module 502, the transformation matrix generation module 503, the information location determination module 504 and the information extraction module 505, reference may be made to the relevant descriptions of steps 201-205 in the corresponding embodiment of FIG. 2 respectively, and detailed description thereof will be omitted.

In some alternative implementations of the present embodiment, the key point location determination module 502 is further configured to: acquire a key point detection model corresponding to the category of the target document image; and input the target document image to the key point detection model to obtain the key point locations on the target document image.

In some alternative implementations of the present embodiment, the transformation matrix generation module 503 is further configured to: generate a first transformation matrix from the key point locations on the target document image to the key point locations on the location template; and the information location determination module 504 is further configured to: transform the target document image based on the first transformation matrix to obtain a transformed document image; and use the locations of information on the location template as locations of information on the transformed document image.

In some alternative implementations of the present embodiment, the transformation matrix generation module 503 is further configured to: generate a second transformation matrix from the key point locations on the location template to the key point locations on the target document image; and the information location determination module 504 is further configured to: transform the locations of information on the location template based on the second transformation matrix to obtain the locations of information on the target document image.

In some alternative implementations of the present embodiment, the apparatus 500 for extracting information further includes a model training module (not shown in the figure), and the model training module is further configured to: acquire a document image set of the same category as the target document image, and key point locations on document images in the document image set; label the corresponding document images based on the key point locations on the document images in the document image set to generate a sample document image set; and train to obtain the key point detection model using the sample document image set.

In some alternative implementations of the present embodiment, the apparatus 500 for extracting information further includes a template generation module (not shown in the figure), and the template generation module is further configured to: acquire a standard document image of the same category as the target document image, and key point locations and locations of information on the standard document image; and label the standard document image based on the key point locations and the locations of information on the standard document image to generate the location template.

According to an embodiment of the present disclosure, an embodiment of the present disclosure further provides an electronic device and a readable storage medium.

Figure 6:
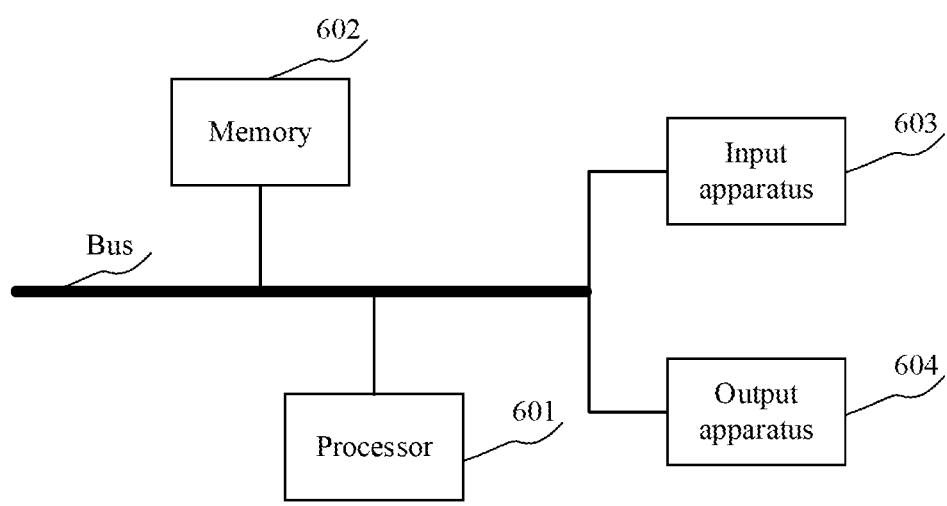
FIG. 6 is a block diagram of an electronic device used to implement the method for extracting information of an embodiment of the present disclosure.

As shown in FIG. 6, a block diagram of an electronic device of the method for extracting information according to an embodiment of the present disclosure is illustrated. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 6, the electronic device includes: one or more processors 601, a memory 602, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of electronic devices may be connected, and the devices provide some necessary operations, for example, as a server array, a set of blade servers, or a multi-processor system. In FIG. 6, one processor 601 is used as an example.

The memory 602 is a non-transitory computer readable storage medium provided by embodiments of the present disclosure. The memory stores instructions executable by at least one processor, so that the at least one processor performs the method for extracting information provided by embodiments of the present disclosure. The non-transitory computer readable storage medium of embodiments of the present disclosure stores computer instructions for causing a computer to perform the method for extracting information provided by embodiments of the present disclosure.

The memory 602, as a non-transitory computer readable storage medium, may be used to store non-transitory software programs, non-transitory computer executable programs and modules, such as program instructions/modules corresponding to the method for extracting information in embodiments of the present disclosure (for example, the location template acquisition module 501, the key point location determination module 502, the transformation matrix generation module 503, the information location determination module 504 and the information extraction module 505 as shown in FIG. 5). The processor 601 executes the non-transitory software programs, instructions, and modules stored in the memory 602 to execute various functional applications and data processing of the server, that is, to implement the method for extracting information in the foregoing method embodiments.

The memory 602 may include a storage program area and a storage data area, where the storage program area may store an operating system and at least one function required application program; and the storage data area may store data created by the use of the electronic device of the method for extracting information, etc. In addition, the memory 602 may include a high-speed random access memory, and may also include a non-transitory memory, such as at least one magnetic disk storage device, a flash memory device, or other non-transitory solid-state storage devices. In some embodiments, the memory 602 may optionally include memories remotely provided with respect to the processor 601, and these remote memories may be connected to the electronic device of the method for extracting information through a network. Examples of the above network include but are not limited to the Internet, intranet, local area network, mobile communication network, and combinations thereof.

The electronic device of the method for extracting information may further include: an input apparatus 603 and an output apparatus 604. The processor 601, the memory 602, the input apparatus 603, and the output apparatus 604 may be connected through a bus or in other methods. In FIG. 6, connection through a bus is used as an example.

The input apparatus 603 may receive inputted digital or character information, and generate key signal inputs related to user settings and function control of the electronic device of the method for extracting information, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, and the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with embodiments of the systems and the technologies described herein), or a computing system that includes any combination of such backend components, middleware components, or frontend components. The components of the system may be interconnected by any form or medium of digital data communication (e.g., communication network). Examples of the communication network include: local area network (LAN), wide area network (WAN), and the Internet.

The computer system may include a client and a server. The client and the server are generally far from each other and usually interact through the communication network. The relationship between the client and the server is generated by computer programs that run on the corresponding computer and have a client-server relationship with each other.

According to the technical solution of embodiments of the present disclosure, first acquiring a location template corresponding to a category of a target document image; determining key point locations on the target document image; then generating a transformation matrix based on the key point locations on the target document image and key point locations on the location template; determining locations of information corresponding to the target document image, based on locations of information on the location template and the transformation matrix; and finally extracting information at the locations of information corresponding to the target document image to obtain information in the target document image. By constructing a location template of a document image of a specific category, locations of information corresponding to the document image of the category are determined, and information is extracted from the locations of information corresponding to the document image, thereby achieving simple and rapid information extraction.

It should be understood that the various forms of processes shown above may be used to reorder, add, or delete steps. For example, the steps described in the present disclosure may be performed in parallel, sequentially, or in different orders, as long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement, etc. made within the spirit and principle of the present disclosure shall be included in the protection scope of embodiments of the present disclosure.

What is claimed is:

1. A method for extracting information, the method comprising:
    acquiring a location template corresponding to a category of a target document image;
    determining key point locations on the target document image;
    generating a transformation matrix based on the key point locations on the target document image and key point locations on the location template;
    determining locations of information corresponding to the target document image, based on locations of information on the location template and the transformation matrix; and
    extracting information at the locations of information corresponding to the target document image to obtain information in the target document image;
    wherein the generating a transformation matrix based on the key point locations on the target document image and key point locations on the location template, comprises:
    generating a first transformation matrix from the key point locations on the target document image to the key point locations on the location template; and
    the determining locations of information corresponding to the target document image, based on locations of information on the location template and the transformation matrix, comprises:
    transforming the target document image based on the first transformation matrix to obtain a transformed document image; and
    using the locations of information on the location template as locations of information on the transformed document image.

2. The method according to claim 1, wherein the determining key point locations on the target document image, comprises:
    acquiring a key point detection model corresponding to the category of the target document image; and
    inputting the target document image to the key point detection model to obtain the key point locations on the target document image.

3. The method according to claim 2, wherein the key point detection model is trained by:
    acquiring a document image set of the same category as the target document image, and key point locations on document images in the document image set;

labeling the corresponding document images based on the key point locations on the document images in the document image set to generate a sample document image set; and training to obtain the key point detection model using the sample document image set.

4. The method according to claim 1, wherein the generating a transformation matrix based on the key point locations on the target document image and key point locations on the location template, comprises:

generating a second transformation matrix from the key point locations on the location template to the key point locations on the target document image; and the determining locations of information corresponding to the target document image, based on locations of information on the location template and the transformation matrix, comprises:

transforming the locations of information on the location template based on the second transformation matrix to obtain the locations of information on the target document image.

5. The method according to claim 1, wherein the location template is generated by:

acquiring a standard document image of the same category as the target document image, and key point locations and locations of information on the standard document image; and labeling the standard document image based on the key point locations and the locations of information on the standard document image to generate the location template.

6. An electronic device, comprising:

at least one processor; and a memory, communicatively connected with the at least one processor;

the memory storing an instruction executable by the at least one processor, the instruction, when executed by the at least one processor, causing the at least one processor to perform operations, the operations comprising:

acquiring a location template corresponding to a category of a target document image;

determining key point locations on the target document image;

generating a transformation matrix based on the key point locations on the target document image and key point locations on the location template;

determining locations of information corresponding to the target document image, based on locations of information on the location template and the transformation matrix; and extracting information at the locations of information corresponding to the target document image to obtain information in the target document image;

wherein the generating a transformation matrix based on the key point locations on the target document image and key point locations on the location template, comprises:

generating a first transformation matrix from the key point locations on the target document image to the key point locations on the location template; and the determining locations of information corresponding to the target document image, based on locations of information on the location template and the transformation matrix, comprises:

transforming the target document image based on the first transformation matrix to obtain a transformed document image; and using the locations of information on the location template as locations of information on the transformed document image.

7. The electronic device according to claim 6, wherein the determining key point locations on the target document image, comprises:

acquiring a key point detection model corresponding to the category of the target document image; and inputting the target document image to the key point detection model to obtain the key point locations on the target document image.

8. The electronic device according to claim 7, wherein the key point detection model is trained by:

acquiring a document image set of the same category as the target document image, and key point locations on document images in the document image set;

labeling the corresponding document images based on the key point locations on the document images in the document image set to generate a sample document image set; and training to obtain the key point detection model using the sample document image set.

9. The electronic device according to claim 6, wherein the generating a transformation matrix based on the key point locations on the target document image and key point locations on the location template, comprises:

generating a second transformation matrix from the key point locations on the location template to the key point locations on the target document image; and the determining locations of information corresponding to the target document image, based on locations of information on the location template and the transformation matrix, comprises:

transforming the locations of information on the location template based on the second transformation matrix to obtain the locations of information on the target document image.

10. The electronic device according to claim 6, wherein the location template is generated by:

acquiring a standard document image of the same category as the target document image, and key point locations and locations of information on the standard document image; and labeling the standard document image based on the key point locations and the locations of information on the standard document image to generate the location template.

11. A non-transitory computer readable storage medium, storing a computer instruction, the computer instruction being used to cause a computer to perform operations, the operations comprising:

acquiring a location template corresponding to a category of a target document image;

determining key point locations on the target document image;

generating a transformation matrix based on the key point locations on the target document image and key point locations on the location template;

determining locations of information corresponding to the target document image, based on locations of information on the location template and the transformation matrix; and extracting information at the locations of information corresponding to the target document image to obtain information in the target document image;

wherein the generating a transformation matrix based on the key point locations on the target document image and key point locations on the location template, comprises:

generating a first transformation matrix from the key point locations on the target document image to the key point locations on the location template; and the determining locations of information corresponding to the target document image, based on locations of information on the location template and the transformation matrix, comprises:

transforming the target document image based on the first transformation matrix to obtain a transformed document image; and using the locations of information on the location template as locations of information on the transformed document image.

12. The non-transitory computer readable storage medium according to claim 11, wherein the determining key point locations on the target document image, comprises:

acquiring a key point detection model corresponding to the category of the target document image; and inputting the target document image to the key point detection model to obtain the key point locations on the target document image.

13. The non-transitory computer readable storage medium according to claim 12, wherein the key point detection model is trained by:

acquiring a document image set of the same category as the target document image, and key point locations on document images in the document image set;

labeling the corresponding document images based on the key point locations on the document images in the document image set to generate a sample document image set; and training to obtain the key point detection model using the sample document image set.

14. The non-transitory computer readable storage medium according to claim 11, wherein the generating a transformation matrix based on the key point locations on the target document image and key point locations on the location template, comprises:

generating a second transformation matrix from the key point locations on the location template to the key point locations on the target document image; and the determining locations of information corresponding to the target document image, based on locations of information on the location template and the transformation matrix, comprises:

transforming the locations of information on the location template based on the second transformation matrix to obtain the locations of information on the target document image.

15. The non-transitory computer readable storage medium according to claim 11, wherein the location template is generated by:

acquiring a standard document image of the same category as the target document image, and key point locations and locations of information on the standard document image; and labeling the standard document image based on the key point locations and the locations of information on the standard document image to generate the location template.

* * * * *